United States Patent [19]
Wang et al.

[11] Patent Number: 6,048,579
[45] Date of Patent: Apr. 11, 2000

[54] PRIMER FOR IMPROVING THE BONDING OF ADHESIVES TO NONPOROUS SUBSTRATES

[75] Inventors: Xiaobin Wang; Brian J. Briddell, both of Jackson, Mich.

[73] Assignee: Adco Products, Inc., Michigan Center, Mich.

[21] Appl. No.: 09/396,703

[22] Filed: Sep. 15, 1999

Related U.S. Application Data

[62] Division of application No. 09/107,810, Jun. 30, 1998, Pat. No. 6,008,305.

[51] Int. Cl.[7] ............................................. B05D 3/02
[52] U.S. Cl. ..................... 427/387; 524/770; 524/773; 524/858; 528/24; 528/34; 528/35; 528/41
[58] Field of Search ..................................... 524/770, 773, 524/858; 528/35, 34, 41, 24; 427/387

[56] References Cited

U.S. PATENT DOCUMENTS

| | | |
|---|---|---|
| 3,632,557 | 1/1972 | Brode et al. . |
| 3,707,521 | 12/1972 | DeSantis . |
| 3,711,445 | 1/1973 | Chu et al. . |
| 3,779,794 | 12/1973 | DeSantis . |
| 3,886,226 | 5/1975 | Asai etal. . |
| 3,979,344 | 9/1976 | Bryant et al. . |
| 4,408,021 | 10/1983 | Penn . |
| 4,525,511 | 6/1985 | Kirby et al. . |
| 4,624,996 | 11/1986 | Rizk et al. . |
| 4,625,012 | 11/1986 | Rizk et al. . |
| 4,643,794 | 2/1987 | Saracsan et al. . |
| 4,719,267 | 1/1988 | Rizk et al. . |
| 4,857,366 | 8/1989 | Schumacher . |
| 4,882,003 | 11/1989 | Bugg et al. . |
| 4,889,768 | 12/1989 | Yokoshima et al. . |
| 5,115,086 | 5/1992 | Hsieh . |
| 5,238,993 | 8/1993 | Hsieh . |
| 5,363,994 | 11/1994 | Angeline . |
| 5,484,864 | 1/1996 | Usifer et al. .............................. 526/301 |
| 5,492,951 | 2/1996 | Beyrle et al. . |
| 5,554,686 | 9/1996 | Frisch, Jr. et al. ......................... 528/28 |
| 5,567,530 | 10/1996 | Drujon et al. . |
| 5,623,044 | 4/1997 | Chiao . |

FOREIGN PATENT DOCUMENTS

| | | |
|---|---|---|
| 0 070 475 | 1/1983 | European Pat. Off. . |
| 0 202 491 | 11/1986 | European Pat. Off. . |
| 0 354 472 | 2/1990 | European Pat. Off. . |
| 0 450 105 | 10/1991 | European Pat. Off. . |
| 61 218631 | 9/1986 | Japan . |

*Primary Examiner*—Melvyn I. Marquis
*Attorney, Agent, or Firm*—Killworth, Gottman, Hagan & Schaeff, L.L.P.

[57] ABSTRACT

A primer for promoting adhesion between an elastomeric adhesive and a nonporous substrate containing a silane-modified saturated polyester polymer and an adhesion promoter in an anhydrous solvent. The invention is also directed to a silane-modified saturated polyester polymer, and an adhesion promoter made by the reaction of a multifunctional isocyanate and an organosilane.

16 Claims, No Drawings

PRIMER FOR IMPROVING THE BONDING OF ADHESIVES TO NONPOROUS SUBSTRATES

CROSS REFERENCE TO RELATED APPLICATIONS

This application is a division of U.S. patent application Ser. No. 09/107,810, filed Jun. 30, 1998 now U.S. Pat. No. 6,008,305.

FIELD OF THE INVENTION

The invention relates to primer compositions for improving the bonding of elastomeric adhesives, such as urethanes, silylated urethanes, silyl-terminated polyethers and silicones to nonporous substrates, such as coated and uncoated metal, glass and polymeric surfaces. More particularly, the invention relates to such primer compositions, methods for making such compositions, and methods for their use.

BACKGROUND OF THE INVENTION

In the manufacture of motor vehicles, glass components, such as windshields, side windows and backlights, are joined to the metal vehicle body by means of an elastomeric adhesive material which may also function as a sealant. The adhesive materials which are used for this purpose are required to meet a number of criteria including appearance, ease of application, shear strength, and adhesion in crash tests. Therefore, good adhesion is required between the adhesives and the various nonporous metal, glass and polymeric substrates to which it is bonded.

In order to obtain acceptable levels of adhesion between the adhesives and the nonporous surfaces, various primers have been used to precoat the nonporous surfaces to enable the adhesive to bond better to them. In original equipment manufacture and glass replacement processes, primers are generally applied to both the metal and glass surfaces prior to application of the adhesive. The metal surfaces may be aluminum or steel, and may be bare, treated, or coated with various types of paints or enamels. Various polymeric materials may also be used in place of the glass components, or as structural members in place of the metal components. A current technique for joining glass to metal in vehicles uses an elastomeric urethane or silylated urethane adhesive. Other elastomeric adhesives which can be used include silyl-terminated polyethers and silicones. All of these adhesives may also be used to bond polymeric substrates to glass or metal, or to each other.

A number of primer compositions have been proposed for promoting adhesion between urethane adhesives or sealants and nonporous materials in technologies relating to motor vehicle manufacture as well as other areas.

For example, U.S. Pat. No. 3,707,521, and its divisional, U.S. Pat. No. 3,779,794, discuss a polyurethane adhesive primer composition comprising a branched polyurethane polymer in combination with a latent catalyst for the moisture curing of free isocyanate groups present.

U.S. Pat. No. 4,882,003 is directed to sealant primer compositions useful for promoting adhesion to enamel paint coated substrates, in which the primer comprises an acrylic polymer base composition, pigment, and a solvent effective to interpenetrate the enamel substrate coating.

U.S. Pat. No. 4,857,366 describes the use of a primer solution of p-toluenesulfonic acid and an organofunctional silane in solvent prior to applying an uncured urethane sealant to painted or glass surfaces.

U.S. Pat. No. 4,625,012, incorporated herein by reference for its discussion of isocyanatosilane adducts, describes a method of making a polyurethane polymer by reacting an isocyanatosilane adduct having at least two isocyanato groups with another isocyanate and a polyol.

U.S. Pat. No. 5,238,993 is directed to a primer comprising a solution of a polyester resin derived from a carboxylic acid and a glycol, an isocyanate and a silane-containing moiety dissolved in a particular mixture of solvents.

Because of the different properties of the various coated and uncoated metal, glass and polymeric substrates, different primers have been used on different types of substrates to obtain optimal adhesion with the adhesives. That is, each nonporous surface being bonded may require its own specific type of primer. Furthermore, primers used with urethane adhesives may not be acceptable for use with silylated urethane, silyl-terminated polyether or silicone adhesives. Therefore, a wide variety of primers have been needed to promote the bonding of different adhesives to different glass, metal and polymeric substrates.

For original equipment manufacturers, it may be reasonable to select a specific primer for a particular combination of adhesive and substrate, and to use different primers on the metal, glass and polymeric surfaces. However, for glass replacement operations working with a variety of metal, glass and polymeric substrates, as well as various adhesive materials, it can be very difficult to maintain and use a wide variety of different primers.

Thus, there is a need for a universal primer which can be used to promote adhesion between the various elastomeric adhesives and the different nonporous substrates to which they must adhere. There is a particular need for such a primer which can be used with the newer silylated urethanes and silyl-terminated polyethers as well as with the conventional urethane adhesives.

DETAILED DESCRIPTION OF THE INVENTION

In accordance with the present invention, there is provided a primer composition for improving the bonding of elastomeric adhesives to nonporous surfaces. The primer provides quick initial adhesion and strong ultimate adhesion. The primer may be used with a variety of adhesives, including urethanes, silylated urethanes, silyl-terminated polyethers and silicones. The substrates to which the adhesive may be bonded include treated or untreated metal, glass and polymeric surfaces, with or without a coating, paint or primer. Such substrates include the glass materials used in motor vehicle components such as windshields, side windows and backlights, with or without ceramic frit on the surface, as well as the body substrates to which they are adhered.

The primer of the present invention comprises:
 a) from about 4 to about 20 weight percent of a silane-modified polyester polymer;
 b) from about 2 to about 14 weight percent of an adhesion promoter, preferably a silane-modified multifunctional isocyanate; and
 c) from about 50 to about 90 weight percent of an anhydrous solvent for said silane-modified polymer and said adhesion promoter.

The polymer used in the primer is a silane-modified polyester, which is preferably saturated and preferably linear. In addition to improving adhesion, this polymer is believed to help the primer form a thin and uniform film on a substrate. Good results are obtained with a primer containing from about 4 to about 20 weight percent (wt %) of the silane-modified polymer, with all percentages by total weight of the primer unless stated otherwise. Preferably, the primer contains from about 8 to about 14 wt % of this silane-modified polymer, and more preferably from about 10 to about 12 wt %.

In one embodiment, the silane-modified polymer is of the formula:

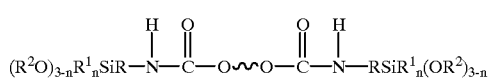 (I)

wherein:

R is a divalent organic moiety, preferably a $C_{1-6}$ alkylene group, and more preferably propylene.

$R^1$ is hydrogen or a $C_{1-4}$ alkyl group, preferably hydrogen.

$R^2$ is a $C_{1-6}$ alkyl group, preferably methyl, ethyl or propyl, most preferably methyl.

The value of n is 0 or 1, but is preferably 0. That is, the Si group can have one $R^1$ and two $OR^2$ substituents, but preferably just has three $OR^2$ substituents.

The

represents a moiety of a difunctional polyester polyol of general formula

which is preferably saturated, preferably linear, and preferably of a molecular weight from about 20,000 to about 30,000 Daltons.

This embodiment of the silane-modified polymer may be made by reacting:

a) a difunctional polyester polyol dissolved in an anhydrous solvent; with b) an isocyanatosilane of the formula:

wherein R, $R^1$, $R^2$ and n are as defined above.

A sufficient amount of the isocyanatosilane should be included to react with all of the active hydroxyl groups on the polyol. One reason for preferring to react all of the hydroxyl groups is that the adhesion promoter component of the primer includes active isocyanate groups which could undesirably react with any unreacted hydroxyl groups on the polymer, especially in the presence of catalyst. Preferably, an excess of the isocyanatosilane is used in the process for forming the silane-modified polymer to prevent such subsequent reaction with the adhesion promoter.

Polyester polyols are well-known polyester resins which are typically products of carboxylic acids and glycols. Preferably a saturated polyester polyol is used. In addition, preferably the polyester polyol is a linear polymer, and preferably it has a molecular weight of from about 20,000 to about 30,000 Daltons. The resin should also be one which is soluble in an anhydrous solvent.

A particularly preferred linear saturated polyester polyol with a molecular weight of about 25,000 is sold under the tradename VITEL® 2200B, and is commercially available from Bostik, Inc.

Examples of commercially available isocyanatosilanes which are suitable for use in the above reaction include gamma-isocyanatopropyltrimethoxysilane, available as Silquest® Y-5187 from OSi Specialties Group, a Witco company (OSi), and gamma-isocyanatopropyltriethoxysilane, available as Silquest® A-1310, also from OSi.

The solvent for this reaction process should be one which will not react with NCO groups. It should therefore be as anhydrous as reasonably possible. Preferably, the solvent should also be able to dissolve the a) and b) reactants at temperatures as low as about 5° C. Examples of suitable solvents include methyl ethyl ketone (MEK), MEK/toluene blends, MEK/ethyl acetate blends, cyclic ethers, chlorinated solvents and mixtures thereof.

In another embodiment the silane-modified polymer is of the formula:

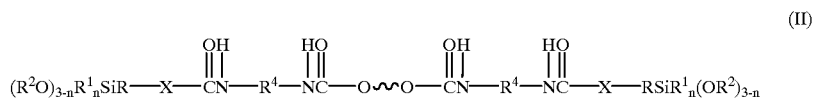 (II)

wherein the

group, R, $R^1$, $R^2$ and n are as defined above in regard to the polymer of Formula I.

X represents an

group or an S, wherein each X may be the same, or different X groups can be combined.

$R^3$ represents H, a $C_{1-6}$ organic moiety, or a second $RSiR^1_n(OR^2)_{3-n}$ group, which may be the same as or different from the first such group. Preferred organic moieties for use as $R^3$ include linear or branched $C_{1-6}$ alkyl and cyclohexyl groups, and, in a particularly preferred embodiment, $R^3$ is a phenyl group.

$R^4$ represents a divalent organic moiety which preferably has a molecular weight of less than about 2000, more preferably less than about 1000, and most preferably less than about 200.

This embodiment of the silane-modified polymer may be made by first reacting a difunctional saturated polyester polyol dissolved in an anhydrous solvent, as described above in regard to the polymer of Formula I, with at least one difunctional isocyanate of the formula OCN—$R^4$—NCO, to produce an isocyanate-terminated intermediate product. A stoichiometric two-to-one molar ratio of difunctional isocyanate to polyol is preferably used to ensure that each available hydroxyl group on the polyol reacts with a difunctional isocyanate.

As discussed above, $R^4$ represents a divalent organic moiety which preferably has a molecular weight of less than about 2000, more preferably less than about 1000, and most preferably less than about 200.

Diisocyanates suitable for use in this reaction are well known in the art. Among the suitable diisocyanates are aromatic monomeric diisocyanates such as 4,4'-diphenylmethane diisocyanate (MDI) and toluene diisocyanate (TDI); aliphatic monomeric diisocyanates such as hexamethylenediisocyanate (HDI); 4,4-dicyclohexylmethane diisocyanate (hydrogenated MDI or HDMI); isophoronediisocyanate; and combinations and derivatives thereof.

The isocyanate-terminated intermediate product of the above reaction is then reacted with at least one organosilane containing an NCO-reacting hydrogen. Preferably, at least a two-to-one molar ratio of organosilane to intermediate product is used. Suitable organosilanes include amino- or mercapto-alkoxysilanes of formula:

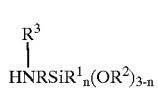  (III)

or of formula:

$HSRSiR^1{}_n(OR^2)_{3-n}$  (IV)

or mixtures thereof, wherein R, $R^1$, $R^2$, $R^3$ and n are as defined above.

In one preferred embodiment of this silane-modified polymer of the present invention, the organosilane is an amino-alkoxysilane in accordance with Formula III, and the $R_3$ group is a $C_{1-6}$ organic moiety. As discussed above, preferred organic moieties for use as $R^3$ include linear or branched $C_{1-6}$ alkyl and cyclohexyl groups, and, in a particularly preferred embodiment, $R^3$ is a phenyl group. A preferred, commercially available phenyl amino-alkoxysilane in accordance with this embodiment is N-phenyl-gamma-aminopropyltrimethoxysilane, available as Silquest® Y-9669 from OSi.

Another commercially available amino-alkoxysilane is N,N-bis[(3-trimethoxysilyl)propyl]amine, available as Silquest® A-1170 from OSi.

A preferred, commercially available mercapto-alkoxysilane in accordance with Formula IV is gamma-mercaptopropyltrimethoxysilane, available under the names Silquest® A-189 and Y-11167 from OSi Specialties Group, or under the name DYNASYLAN® MTMO from Hüls. Another preferred mercapto-alkoxysilane is gamma-mercaptopropylmethyldimethoxysilane, available as DYNASYLAN® 3403 from Hüls.

The adhesion promoter of the present invention is preferably the reaction product of a multifunctional isocyanate, or a combination of multifunctional isocyanates, which should have at least three isocyanate groups per molecule, preferably trifunctional or quadrifunctional isocyanates, with an organosilane. The multifunctional isocyanate is reacted with at least one organosilane containing at least one NCO-reacting hydrogen in proportions to leave at least two unreacted isocyanate groups per molecule in the reaction product. Preferably one mole of the organosilane is reacted with one mole of the multifunctional isocyanate.

Such an adhesion promoter improves the adhesion between a substrate and an adhesive because of its unique chemical structure with both NCO and siloxane groups. Good results are obtained with a primer containing from about 2 wt % to about 14 wt % adhesion promoter. Preferably the primer contains at from about 6 to about 10 wt %, more preferably from about 7 to about 9 wt % of the adhesion promoter.

A preferred multifunctional isocyanate suitable for use in the above reaction is tris(4-isocyanatophenyl)thiophosphate, which is commercially available from Bayer as a 27 wt % solution in ethyl acetate which is sold under the name Desmodur® RF-E. Other suitable commercially available multifunctional isocyanates include tris(4-isocyanatophenyl)methane, which is commercially available as a 27 wt % solution in ethyl acetate under the name Desmodur® RE from Bayer; the reaction products of trimethylolpropane with 3 moles of a diisocyanate; diisocyanate trimers such as those identified as HDI trimer, and 2,4-TDI trimer or 2,6-TDI trimer; and isophorone diisocyanate trimer. Biurets, which are reaction products of urea and isocyanate may also be used, such as HDI biuret, commercially available as Desmodur® N from Bayer. Various polymeric MDI materials may also be used.

The multifunctional isocyanate is reacted with an organosilane containing at least one NCO-reacting hydrogen. Suitable organosilanes for use in this reaction include the amino- and mercapto-alkoxysilanes of Formulas III and IV as discussed above.

In one preferred embodiment of the adhesion promoter of the present invention, the organosilane is an amino-alkoxysilane in accordance with Formula III, and the $R_3$ group is a $C_{1-6}$ organic moiety. As discussed above, preferred organic moieties for use as $R^3$ include linear or branched $C_{1-6}$ alkyl and cyclohexyl groups, and, in a particularly preferred embodiment, $R^3$ is a phenyl group. A preferred, commercially available N-phenylamino-alkoxysilane in accordance with this embodiment is N-phenyl-gamma-aminopropyltrimethoxysilane, available as Silquest® Y-9669 from OSi.

A preferred, commercially available mercapto-alkoxysilane in accordance with Formula IV is gamma-mercaptopropyltrimethoxysilane available under the names Silquest® A-189 and Y-11167 from OSi Specialties Group, or under the name DYNASYLAN® MTMO from Hüls. Another preferred mercapto-alkoxysilane is gamma-mercaptopropylmethyldimethoxysilane, available as DYNASYLAN® 3403 from Hüls.

A multifunctional isocyanate of general formula A(NCO)$_n$, would yield the following products of Formulas V or VI when reacted, respectively, with organosilanes of the above Formulas III or IV:

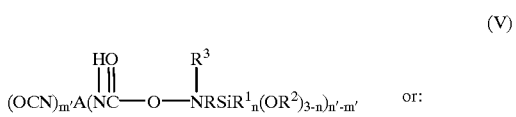  (V)

or:

-continued

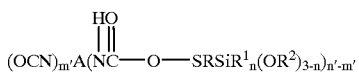
(VI)

wherein m' and n' are integers, and m' is less than n'. Preferably, n'−m' equals 1. That is, preferably only one of the available NCO groups on the multifunctional isocyanate reacts with the organosilane, leaving at least two unreacted isocyanate groups per molecule.

The reaction is preferably carried out with the addition of heat and in the presence of a suitable catalyst, as would be known by one skilled in the art. Suitable catalysts may include those which could also be added to the primer, as discussed below.

The primer of the present invention preferably comprises the silane-modified polyester polymer of the present invention in combination with an adhesion promoter which is the reaction product of a multifunctional isocyanate and a silane. However, the silane-modified polyester polymer of the present invention can also be used in primer compositions which do not contain the adhesion promoter of the present invention. For example, the silane-modified polyester polymer can be used to improve existing primer compositions, or to develop new primer compositions. In such cases, other adhesion promoters may be used. In like manner, the adhesion promoter of the present invention can be used in primer compositions which do not contain the silane-modified polyester polymer.

The solvent used in the primer of the present invention should be capable of dissolving the silane-modified polymer and the adhesion promoter. It should also be anhydrous, because of the high reactivity of NCO and siloxane groups with water. Likewise, the solvent itself should not be reactive with the other components of the primer. In particular, the solvents should not contain any NCO-reacting hydrogens.

For reasonable evaporation rates and drying of the primer, the solvent should preferably have a flash point of less than 40° C. Suitable solvents include acetone, methyl acetate, ethyl acetate and propyl acetate. Higher boiling point solvents such as toluene, xylene or methyl propyl ketone may also be used. Different solvents can be combined to produce a final solvent which has the desired evaporation rate, and results in the formation of a uniform primer film on a substrate.

Enough solvent should be included in the primer to produce a thin and uniform film. The primer should comprise from about 50 to 90 wt % solvent, preferably from about 55 to about 85 wt %, and more preferably from about 60 to about 80 wt %.

The primer of the present invention may also include a catalyst for promoting 1) the reaction of isocyanate and siloxane groups with atmospheric moisture, 2) the condensation reaction of silanol groups, and 3) the reactions at the interfaces between the primer and the substrates and between the primer and the elastomeric adhesive. Examples of suitable catalysts include tertiary amines, such as 1,3,4-trimethylpiperazine; N,N'-dimorpholinodiethyl ether; organotin compounds, such as dibutyltin dilaurate and dibutyltin diacetate; and combinations thereof. Particularly good results may be obtained using a combination of tertiary amine and organotin catalysts, because of an apparent synergism.

The same or different catalysts may also be used in the preparation of the silane-modified polymer and adhesion promoter components of the primer. As a result, there may already be catalyst present in the primer composition when these components are combined. Preferably, the primer should contain at least about 0.05 wt % of catalysts to promote the above reactions, more preferably at least about 0.08 wt %, and even more preferably at least about 0.1 wt %. However, the presence of too much catalyst can reduce the shelf life of the primer, and cause reactions to occur too quickly. Preferably, the total amount of catalyst present in the primer is less than about 0.8 wt %, more preferably less than about 0.4 wt %, and even more preferably less than about 0.2 wt %.

The primer composition may also contain various additives which would be well known to one skilled in the art. Such additives include, but are not limited to, moisture scavengers, NCO stabilizers, fillers, including carbon black as well as non-black fillers, and defoaming agents.

To maintain the primer as anhydrous as possible by removing traces of water, one or more moisture scavengers may also be included in the primer. Because of the high reactivity of NCO and siloxane groups with water, moisture scavengers can be very important for reasonable shelf life and good performance of the primer. Enough scavenger should be included to take care of all the moisture. However, excess amounts of scavengers can adversely affect the rheology and performance of the primer. Preferably the primer contains from about 0.1 to about 1 wt % of such scavengers, preferably from about 0.3 to about 0.7 wt %, with particularly good results at a content of about 0.5 wt %. Well-known moisture scavengers which are suitable for use in the primers of the present invention include 3 Å (0.3 nm) pore molecular sieves, p-toluene sulfonyl isocyanate, silanes, such as vinyltrimethoxysilane and tetramethoxysilane, and combinations thereof.

To further improve shelf life, one or more NCO stabilizers may also be included in the primer. However, these should be added sparingly to avoid interfering with the adhesion performance of the primer. Therefore, the primer should contain not more than about 0.05 wt % NCO stabilizer, preferably about 0.001 to about 0.01 wt %, with good results at about 0.005 wt %. An example of an NCO stabilizer is benzoyl chloride.

Various fillers may also be included in the primer composition. Carbon black may be added as a pigment, UV absorber and reinforcing agent, and to modify the rheological properties of the primer, such as viscosity, sag resistance, and flow rate. It also creates channels for moisture to get into the primer film and vapor to escape during curing. When added, enough carbon black should be used to obtain the desired properties in the primer film. However, an excess can cause rheological problems and loss of strength. The amount of carbon black used should be less than about 12 wt %, preferably less than about 8 wt %, and more preferably less than about 6 wt %. Preferably, a minimum of about 3 wt % carbon black is used, more preferably at least about 4 wt %.

Non-black fillers may also be used in addition to, or in place of the carbon black filler. If a non-black primer is desired, then non-black fillers can be used instead of carbon black. Such fillers can also be used, with or without carbon black, to adjust rheological properties, give soft settlement, reinforce the primer and create channels for moisture and vapor. The amount of these fillers used will depend on whether it is used instead of carbon black, or in addition to carbon black. In general, the primer should contain no more than about 20 wt % of the non-black fillers, and preferably less than about 6 wt %, more preferably less than about 5 wt %. A minimum of about 2 wt % of such fillers is preferably used, more preferably at least about 3 wt %, to obtain the desired effects on the primer.

The primer may also include one or more anhydrous defoaming agents to help form a smooth primer film. Such defoaming agents are well-known to those skilled in the art. No more than about 1 wt % defoaming agent should be used, to avoid undesirable affects on adhesion. Preferably less than about 0.6 wt % is used, more preferably less than about 0.4 wt %. Preferably, a minimum of about 0.1 wt % is used for defoaming, more preferably at least about 0.2 wt %.

The primer of the present invention may be used in a method for promoting the adhesion of an elastomeric adhesive to one or more nonporous surfaces. Thus, the primer can be used to promote the bonding of one nonporous surface to another, when they are adhered to each other by means of an elastomeric adhesive. The primer is applied to the nonporous surface or surfaces, and preferably allowed to set for at least about 20 minutes prior to applying the elastomeric adhesive. An advantage of the present invention is that the same primer can be applied to different nonporous surfaces which are being bonded to each other by means of an elastomeric adhesive, and may also be used with different elastomeric adhesives.

The nonporous surfaces may include structural substrates such as treated or untreated metal surfaces, with or without a coating, paint or primer, glass substrates such as motor vehicle windshields, side windows and backlights, with or without ceramic frit or other coatings on the surface, and polymeric substrates which may be used as either structural or light-passing components. Metal substrates include essentially all metals, such as, without limitation, the steel and aluminum used for window frames in motor vehicles and buildings. The metal may or may not be treated, as by galvanizing or anodizing, or may or may not be coated with a paint, enamel or other primer. The glass substrate may be uncoated window glass, or may be coated with ceramic frit, tinting, polymeric material, or any other glass adherent coating.

The primer of the present invention may be used with a wide variety of polymeric substrates. For example, good results were obtained using the present primer on polyvinyl chloride, polyurethane, polycarbonate and polyvinyl acetate surfaces.

EXAMPLE 1

Preparation of Silane-Modified Polymer

A silane-modified polymer of the type set forth in Formula I above is made in accordance with the present invention by the reaction of a linear saturated polyester polyol with an isocyanatosilane. 87.00 g of VITEL® 2200B polyester polyol (MW 25,000 Daltons, sold by Bostik, Inc.) is dissolved in 210.80 of methyl ethyl ketone (MEK). Then, 3.01 g of gamma-isocyanatopropyltrimethoxysilane (Silquest® Y-5187 sold by OSi Specialties Group) is added to react with the polyester polyol in the presence of 0.0103 g of dibutyltin diacetate (METACURE® T-1 from Air Products and Chemicals, Inc.) at 70° C. for about 3 hours under anhydrous conditions. Analysis indicated that essentially all of the available OH groups of the polyester polyol had reacted with the silane.

EXAMPLE 2

Preparation of Adhesion Promoter

An adhesion promoter is made in accordance with the present invention by reacting an equimolar mixture of multifunctional isocyanate with an organosilane containing an NCO-reacting hydrogen. 175.48 g of Desmodur® RF-E (27% by weight of tris(4-isocyanatophenyl)thiophosphate in ethyl acetate, sold by Bayer) reacts with 21.79 g of A-189™ (gamma-mercaptopropyltrimethoxysilane from OSi) in the presence of 0.0190 g of dibutyltin diacetate at 73° C. for about 2 hours under anhydrous conditions. Analysis indicated that, as desired, approximately one-third of the available NCO groups reacted with the NCO-reacting hydrogens of the organosilane.

EXAMPLE 3

Preparation of Primer

A primer is prepared in accordance with the present invention using the silane-modified polymer of Example 1 and the adhesion promoter of Example 2. The components are combined in a suitable mill, such as a ball mill or a shot mill. 9.99 g of dried Sterling® R carbon black (sold by Cabot Corp.), 6.00 g of dried Monomix™ talc (sold by Luzenac America, Inc.), 38.03 g of anhydrous ethyl acetate, 28.10 g of anhydrous MEK, 0.0600 g of METACURE® T-1 dibutyltin diacetate, 0.0796 g of 1,2,4-trimethylpiperazine, 0.40 g of BYK®-070 defoaming agent (sold by BYK-Chemie USA) and 0.50 g of Baylith® L Powder (3 Å (0.3 nm) molecular sieves sold by Bayer) are charged into the mill and milled until the particle size reaches about 7 Hegman on a Hegman gauge (12.5 $\mu$m). Then, 69.90 g of a silane-modified polymer prepared in accordance with Example 1, 46.02 g of adhesion promoter prepared in accordance with Example 2, and 0.0100 g of benzoyl chloride are added into the mill and milled for one hour. The resulting primer is stored in small containers filled with nitrogen in the head space.

EXAMPLE 4

Peel Adhesion Tests

The primer of Example 3 was tested for its ability to promote bonding between several elastomeric adhesives and various nonporous substrates. The primer is applied to the coupon to a nominal thickness of 20 to 40 $\mu$m, and allowed to air dry for at least 20 minutes at 23° C. and 50% relative humidity. Beads of adhesive (about 3 mm thick, 15 mm wide) are applied to the primered substrate, and cured at 23° C. and 50% relative humidity for about 16 hours. The adhesive beads are then cut with a blade through the primer layer, and an attempt is made to peel the beads from the substrates by pulling.

The failure mode for each test specimen is recorded. There are three types of failure modes, cohesive failure, adhesive failure, and a combination of both. Cohesive failure is one in which the adhesive adheres strongly to the primered substrate, and the failure occurs by breaking the adhesive. Adhesive failure is one in which the adhesive separates from the substrate, with the failure at the interface between the primer and the substrate or between the primer and the adhesive. Preferred primers are ones for which the failure mode is a 100% cohesive failure, indicating a strong bond between the primer and both the substrate and the adhesive.

Tests were conducted using five different commercially available elastomeric adhesives. The first four were ADCO FC-1000™ fast curing silylated urethane auto glass adhesive, ADCO FC-2000™ high viscosity silylated urethane auto glass adhesive, ADCQ AD-380™ quick curing urethane glass adhesive, and TREMSHIELD® 660 heavy body urethane adhesive (all available from ADCO Products, Inc., an AlliedSignal company). The fifth adhesive was U-400™ urethane adhesive, available from Essex Specialty Products, Inc.

The glass substrates tested were glass and ceramic fritted glass. The metal substrates tested were aluminum, cold rolled steel, galvanized steel, E-coated steel, enamel top-coated steel (using JEN IV™ enamel from DuPont, and DCT-5000™ coating from PPG), and steel with an old urethane primer coating (primers tested were WIP-40™, a pinchweld primer from ADCO, and U-413™, a pinchweld primer from Essex). The polymer substrates tested were polyvinylchloride, polyurethane, polycarbonate and polyvinyl acetate.

All of the different elastomeric adhesives were tested with all of the listed substrates. In all of the tests, the failure mode for the Example 3 primer of the present invention was 100% cohesive failure. The results demonstrate that the primer of the present invention is suitable for use on a wide range of substrates with a wide range of different elastomeric adhesives.

EXAMPLE 5

Lap Shear Strength Tests

Tests were conducted in accordance with the standard General Motors test set forth in "Shear Adhesion Test for Adhesives Used in Glass Bonding Procedure" (GM9521P, General Motors Engineering Standards, January 1992), incorporated herein by reference. The crosshead speed was 50 mm/minute, rather than the GM standard of 130 mm/minute. The lap shear strength was measured during the curing process for bonding samples of metal with an existing layer of U-400 adhesive to ceramic fritted glass primed with the primer of Example 3, using ADCO FC-1000™ and ADCO FC-2000™ adhesives. After three hours of curing, all of the samples had developed a lap shear strength in excess of 1000 kPa. After five hours of curing, the FC-1000 samples had developed a lap shear strength of about 1700 kPa, while the FC-2000 sample was at over 2300 kPa. A comparison test was conducted using the FC-1000 adhesive and a commercially available glass primer (ADCO GP-60™ glass primer, preceded by cleaning with ADCO CF-20™ cleaner). After three hours, the lap shear strength was about 150 kPa, and after five hours, it was up to about 1000 kPa. These results demonstrate the quick adhesion development of the primer of the present invention.

EXAMPLE 6

Automobile Crash Test

When primers are used to bond windshields to automobile bodies, they may be subjected to actual vehicle crash tests. The purpose of this test is to determine whether the primer and adhesive are capable of retaining the windshield attached to the car body in a simulated frontal crash. The present test was conducted after a relatively short time period of four hours after the windshield was replaced using the bonding system of ADCO FC-1000™ adhesive and the primer of Example 3. The test was conducted using NHTSA's Office of Vehicle Safety Compliance (OVSC) Laboratory Test Procedure No. TP-301-01 as a guideline. A 1996 Ford Taurus® car was used as the test vehicle. The original windshield was removed and a new replacement windshield installed using ADCO FC-1000™ adhesive. Before applying the adhesive, the primer of Example 3 was applied to both the new windshield and the body-side substrate, which still had some existing primer and adhesive present. The primer was allowed to set for about 20 minutes. The adhesive and primer were allowed to cure for four hours, with the temperature ranging from 68 to 73° F. (20–23° C.), and the relative humidity from 46% to 53%, respectively. The vehicle was equipped with air bags, and uninstrumented dummies restrained with seatbelts were in the front seats. The vehicle was traveling at about 35 mph when it impacted a flat frontal barrier. The windshield shattered, but retention of the windshield by the body substrate was 100%.

This results indicate this bonding system passed this test and would therefore be qualified for use in windshield installations. It is significant to note that this bonding system was able to pass the test after only four hours of curing. This provides a relatively short time for safely driving away after a windshield replacement.

EXAMPLE 7

Another silane-modified polymer of the type set forth in Formula I is made by the process set forth in Example I, except that gamma-isocyanatopropyltriethoxysilane, available from OSi as Silquest® A-1310, is used as the isocyanatosilane. In this case, with reference to Formula I, $R^2$ is an ethyl group, instead of a methyl group which would be the case for Example 1. The silane-modified polymer of this example can also be used to produce primers in accordance with the present invention.

EXAMPLE 8

This example illustrates the preparation of a silane-modified polymer of the type set forth in Formula II above. In this process, one mole of the same polyester polyol used in Example 1 is first reacted with two moles of a difunctional isocyanate. The difunctional isocyanates used are commercially available MDI, TDI, HDMI and HDI, as identified above. In each case, the isocyanate is reacted with the polyol to form an isocyanate terminated intermediate product.

The intermediate products are each then reacted further with two moles of various organosilanes to form silane-modified polymers of the type set forth in Formula II. A first set of samples is made by combining each of the intermediate products with an amino-alkoxysilane in accordance with the above Formula III. The silane used for these samples is N-phenyl-gamma-aminopropyltrimethoxysilane, available as Silquest® Y-9669 from OSi. A second set of samples is made by combining each of the intermediate products with a mercapto-alkoxysilane in accordance with Formula IV. The silanes used for these samples are gamma-mercaptopropyltrimethoxysilane, available as Silquest® A-189 from OSi, and gamma-mercaptopropylmethyldimethoxysilane, available as DYNASYLAN® 3403 from Hüls. Each of the silane-modified polymers of this example can then be used to produce primers in accordance with the present invention.

EXAMPLE 9

In this example, other samples of silane-modified multifunctional isocyanate adhesion promoters are made in accordance with the process set forth in Example 2. In each case an equimolar mixture of a multifunctional isocyanate is reacted with an organosilane in accordance with Formula III or IV above, each containing an NCO-reacting hydrogen. The multifunctional isocyanates used are tris(4-isocyanatophenyl)methane, available as a 27 wt % solution in ethyl acetate under the name Desmodur® RE from Bayer; commercially available diisocyanate trimers including HDI trimer, 2,4-TDI trimer and 2,6-TDI trimer; isophorone diisocyanate trimer; and HDI biuret, commercially available as Desmodur® N from Bayer.

A first set of samples is made by combining each of the multifunctional isocyanates with an amino-alkoxysilane in accordance with the above Formula III. The silane used for these samples is N-phenyl-gamma-aminopropyltrimethoxysilane, available as Silquest® Y-9669 from OSi. A second set of samples is made by combining each of the multifunctional isocyanates with a mercapto-alkoxysilane in accordance with Formula IV. The silanes used for these samples are gamma-mercaptopropyltrimethoxysilane, available as Silquest® A-189 from OSi, whcih was used in Example II, and gamma-mercaptopropylmethyldimethoxysilane, available as DYNASYLAN® 3403 from Hüls. Each of the silane-modified adhesion promoters of this example can then be used to produce primers in accordance with the present invention.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A primer comprising:
   a) from about 4 to about 20 weight percent of a silane-modified polyester polymer;
   b) from about 2 to about 14 weight percent of an adhesion promoter; and
   c) from about 50 to about 90 weight percent of an anhydrous solvent.

2. The primer of claim 1 wherein the silane-modified polyester polymer has the formula:

$$(R^2O)_{3-n}R^1_nSiR-N(H)-C(=O)-O\sim\sim O-C(=O)-N(H)-RSiR^1_n(OR^2)_{3-n} \quad (I)$$

or $$(R^2O)_{3-n}R^1_nSiR-X-C(OH)=N-R^4-N=C(OH)-O\sim\sim O-C(OH)=N-R^4-N=C(OH)-X-RSiR^1_n(OR^2)_{3-n} \quad (II)$$

wherein:

the

O$\sim\sim$O represents a moiety of a difunctional polyester polyol of general formula HO$\sim\sim$OH;

X represents an $$\begin{array}{c} R^3 \\ | \\ N \end{array}$$

group or an S, and each X may be the same or different;

each R represents a divalent organic moiety;
each $R^1$ represents hydrogen or a $C_{1-4}$ alkyl group;
each $R^2$ represents a $C_{1-6}$ alkyl group;
each $R^3$ represents H, a $C_{1-6}$ organic moiety, or a second $RSiR^1_n(OR^2)_{3-n}$ group, which may be the same as or different from the first such group;
each $R^4$ represents a divalent organic moiety; =p1 and n is 0 or 1.

3. The primer of claim 1 wherein the adhesion promoter is the reaction product of a multifunctional isocyanate and at least one organosilane containing an NCO-reacting hydrogen of the formula:

$$\begin{array}{c} R^3 \\ | \\ HNRSiR^1_n(OR^2)_{3-n} \end{array} \quad (III)$$

or of the formula:

$$HSRSiR^1_n(OR^2)_{3-n} \quad (IV)$$

or mixtures thereof,
wherein:
each R represents a divalent organic moiety;
each $R^1$ represents hydrogen or a $C_{1-4}$ alkyl group;
each $R^2$ represents a $C_{1-6}$ alkyl group;
each $R^3$ represents H, a $C_{1-6}$ organic moiety, or a second $RSiR^1_n(OR^2)_{3-n}$ group, which may be the same as or different from the first such group; and
n is 0 or 1,
and wherein the equivalent ratio between the NCO groups of the multifunctional isocyanate and the NCO-reacting hydrogens is at least about 3.

4. The primer of claim 1 further comprising one or more additives selected from the group consisting of catalysts, moisture scavengers, NCO stabilizers, carbon black, non-black fillers, and defoaming agents.

5. A method for promoting the adhesion of an elastomeric adhesive to at least one nonporous substrate comprising treating the nonporous substrate with the primer of claim 1.

6. The method of claim 5 wherein the elastomeric adhesive is adhered to two different substrates, and the same primer is applied to both substrates.

7. The method of claim 6 wherein the elastomeric adhesive is selected from the group consisting of urethanes, silylated urethanes, silyl-terminated polyethers and silicones.

8. The primer of claim 3 wherein said organosilane is an amino-alkoxysilane in accordance with Formula III.

9. The primer of claim 3 wherein said organosilane is an amino-alkoxysilane in which $R_3$ is a $C_{1-6}$ organic moiety.

10. The primer of claim 9 wherein $R_3$ is phenyl.

11. The primer of claim 10 wherein said amino-alkoxysilane is N-phenyl-gamma-aminopropyltrimethoxysilane.

12. The primer of claim 3 wherein said organosilane is a mercapto-alkoxysilane in accordance with Formula IV.

13. The primer of claim 12 wherein said mercapto-alkoxysilane is gamma-mercaptopropyltrimethoxysilane or gamma-mercaptopropylmethyldimethoxysilane.

14. The primer of claim 1 wherein said silane-modified polyester polymer is the reaction product of:
   a) the reaction product of a difunctional polyester polyol dissolved in an anhydrous solvent with at least one difunctional isocyanate of the formula OCN—$R^4$—NCO; and
   b) at least one organosilane containing an NCO-reacting hydrogen of the formula:

$$HNRSiR^1{}_n(OR^2)_{3-n} \quad \overset{R^3}{|} \qquad \text{(III)}$$

or of formula:

$$HSRSiR^1{}_n(OR^2)_{3-n} \qquad \text{(IV)}$$

or mixtures thereof, wherein:
   each R represents a divalent organic moiety;
   each $R^1$ represents hydrogen or a $C_{1-4}$ alkyl group;
   each $R^2$ represents a $C_{1-6}$ alkyl group;
   each $R^3$ represents H, a $C_{1-6}$ organic moiety, or a second $RSiR^1{}_n(OR^2)_{3-n}$ group, which may be the same as or different from the first such group;
   each $R^4$ represents a divalent organic moiety; and
   n is 0 or 1.

15. The primer of claim 14 wherein the molar ratio of difunctional isocyanate to difunctional polyester polyol is about two to one.

16. The primer of claim 14 wherein the molar ratio of organosilane to the reaction product of a) is at least about two to one.

* * * * *